United States Patent
Watanabe

(10) Patent No.: US 8,531,391 B2
(45) Date of Patent: Sep. 10, 2013

(54) INPUT DEVICE AND DISPLAY INPUT DEVICE USING THE SAME

(75) Inventor: Takeshi Watanabe, Tokyo (JP)

(73) Assignee: ALPS Electric Co., Ltd., Tokyo (JP)

( * ) Notice: Subject to any disclaimer, the term of this patent is extended or adjusted under 35 U.S.C. 154(b) by 1827 days.

(21) Appl. No.: 11/148,869

(22) Filed: Jun. 9, 2005

(65) Prior Publication Data
US 2005/0280003 A1    Dec. 22, 2005

(30) Foreign Application Priority Data

Jun. 18, 2004  (JP) .................................. 2004-180461

(51) Int. Cl.
*H04B 1/18* (2006.01)
*C09K 19/00* (2006.01)

(52) U.S. Cl.
USPC .............................. 345/156; 345/173; 428/1.2

(58) Field of Classification Search
USPC ................ 345/156, 157, 158, 162, 173, 174, 345/175, 178, 179, 180, 181, 182, 183, 184; 178/18.01, 18.02, 18.03, 18.04, 18.05, 18.06, 178/18.07, 18.08, 18.09, 18.11, 19.01, 20.01, 178/20.02, 20.03, 20.04; 428/1.2
See application file for complete search history.

(56) References Cited

U.S. PATENT DOCUMENTS

| | | | | |
|---|---|---|---|---|
| 4,329,189 A | * | 5/1982 | Noad et al. ........................ | 438/44 |
| 4,456,999 A | * | 6/1984 | Sugino et al. .............. | 372/45.01 |
| 4,815,082 A | * | 3/1989 | Isshiki et al. ............... | 372/45.01 |
| 5,083,186 A | * | 1/1992 | Okada et al. .................. | 257/669 |
| 5,471,095 A | * | 11/1995 | Kaminaga et al. ............ | 257/775 |
| 5,558,795 A | * | 9/1996 | Frank ............................. | 219/604 |
| 6,110,824 A | * | 8/2000 | Licata et al. .................. | 438/666 |
| 6,529,188 B1 | * | 3/2003 | Suzuki ......................... | 345/173 |
| 6,636,355 B2 | * | 10/2003 | Moshrefzadeh et al. ..... | 359/460 |
| 6,992,394 B2 | * | 1/2006 | Park et al. ..................... | 257/775 |
| 7,086,773 B2 | * | 8/2006 | Kim et al. ..................... | 362/621 |
| 7,133,019 B2 | * | 11/2006 | Ogiwara et al. .............. | 345/102 |

(Continued)

FOREIGN PATENT DOCUMENTS

| | | | | |
|---|---|---|---|---|
| JP | 11186588 A | * | 7/1999 | |
| JP | 2000047178 A | * | 2/2000 | |
| JP | 2002-222055 | | 8/2002 | |

OTHER PUBLICATIONS

JP 2000-047178 English Translation, Yamada, Feb. 18, 2000, pp. 1-11.*

Primary Examiner — Kent Chang
Assistant Examiner — Scott Au
(74) *Attorney, Agent, or Firm* — Brinks Hofer Gilson & Lione

(57) ABSTRACT

An input device includes an upper sheet having a resistive film formed on a lower surface thereof and a lower substrate disposed in a co-planar relationship below the upper sheet and spaced apart from the upper sheet by a gap, where the lower substrate has a resistive film formed on an upper surface thereof. The lower substrate has opposite side edge portions disposed along a longitudinal axis of the lower substrate, and the side edge portions have an incline or taper along a thickness axis of the lower substrate. A pair of lower electrodes are formed on the resistive film of the lower substrate, and are disposed parallel to the side edge portions of the lower substrate, such that when pressure is applied to an operation portion of the upper sheet, the upper sheet flexes toward the lower substrate, and planar coordinates of the operation portion are determined based on a voltage between the pair of lower electrodes.

5 Claims, 5 Drawing Sheets

(56) References Cited

U.S. PATENT DOCUMENTS

| | | | |
|---|---|---|---|
| 7,186,650 B1* | 3/2007 | Dakshina-Murthy | 438/689 |
| 7,199,788 B2* | 4/2007 | Ise et al. | 345/173 |
| 7,268,770 B1* | 9/2007 | Takahata et al. | 345/173 |
| 2002/0080484 A1* | 6/2002 | Moshrefzadeh et al. | 359/460 |
| 2003/0184705 A1* | 10/2003 | Murade et al. | 349/158 |
| 2004/0066379 A1* | 4/2004 | Ise et al. | 345/175 |
| 2004/0090430 A1* | 5/2004 | Kong | 345/173 |
| 2004/0175562 A1* | 9/2004 | Hayashi et al. | 428/330 |

* cited by examiner

FIG. 1
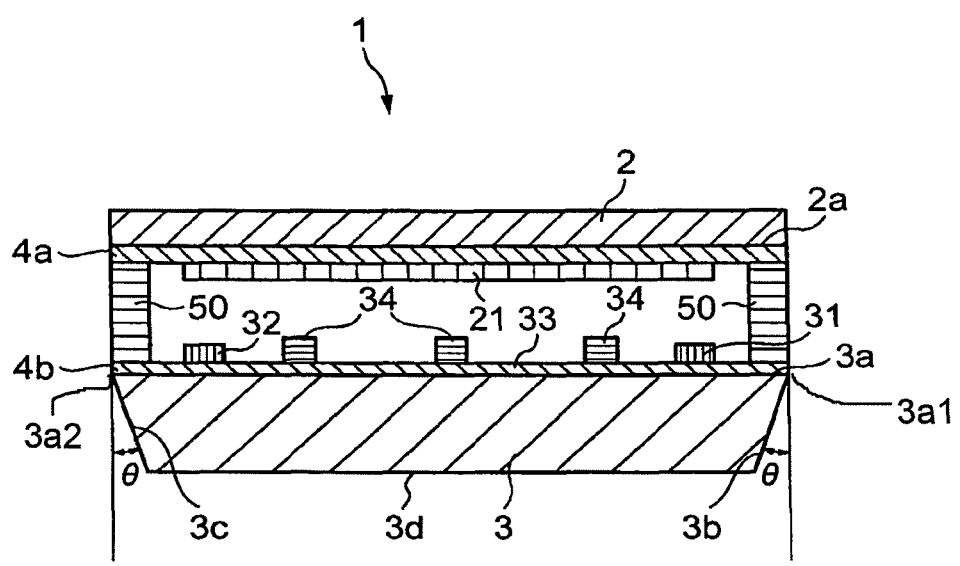
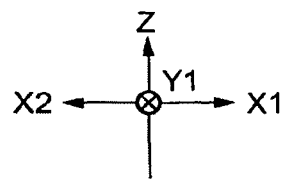

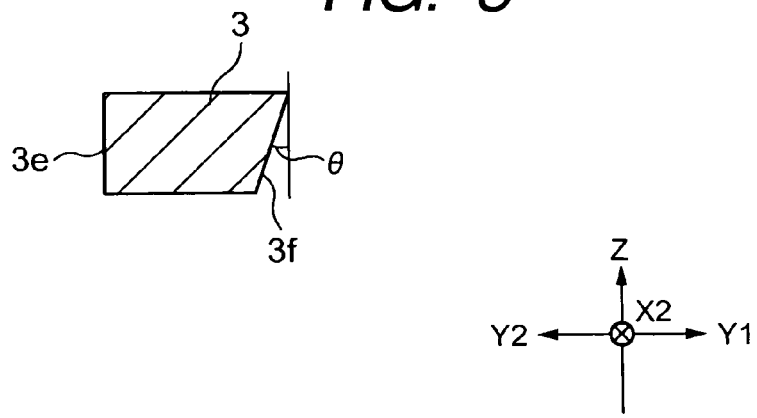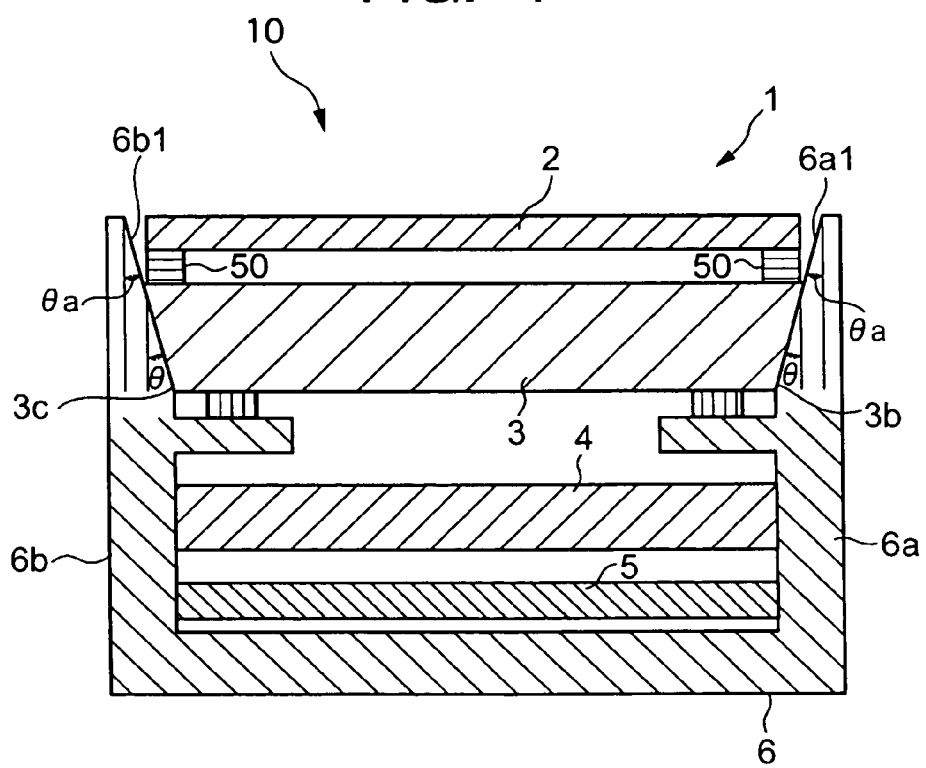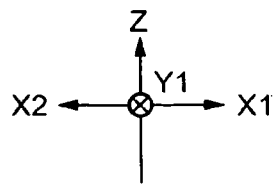

INPUT DEVICE AND DISPLAY INPUT DEVICE USING THE SAME

This application claims the benefit of priority to Japanese Patent Application No. 2004-180461, filed on Jun. 18, 2004, herein incorporated by reference

BACKGROUND OF THE INVENTION

1. Field of the Invention

The present invention relates to an input device, such as a touch panel, or the like, and a display input device using the same. More particularly, the present invention relates to an input device that can prevent a resistive film from being formed on sides of a substrate of the input device with a simple structure and that can reduce a warp of the substrate, and to a display input device using the input device.

2. Description of the Related Art

Conventionally, as an input device, such as a touch panel or the like, for example, it has been suggested an input device disclosed in Japanese Unexamined Patent Application Publication No. 2002-222055.

In Japanese Unexamined Patent Application Publication No. 2002-222055, as shown in FIG. 6A, a touch panel 101 that is disposed on a screen of a liquid crystal display or the like (not shown) is disclosed.

FIG. 6A is a cross-sectional view of an input device according to the related art. FIG. 6B is a diagram illustrating a method of forming a transparent electrode on a lower electrode substrate of the input device shown in FIG. 6A.

The touch panel 101 has a flexible upper electrode sheet 103 that is made of a substantially rectangular transparent film and has a transparent electrode 102 made of ITO (Indium Tin Oxide) or the like formed on the lower surface thereof, and a lower electrode substrate 105 that is made of a transparent plastic substrate having the substantially same shape as the upper electrode sheet 103 and has a transparent electrode 104 formed on the upper surface thereof. The upper electrode sheet 103 and the lower electrode substrate 105 are disposed to face each other at a predetermined gap via a circuit resist 106, such that the transparent electrodes face each other. The circuit resist 106 is formed to have a predetermined width along the periphery of the rectangular sheet or substrate.

The touch panel 101 is disposed on the screen of the liquid crystal display or the like. An operator partially presses the upper electrode sheet with a pen or the like from the top of the upper electrode sheet according to an instruction on a perspective screen while seeing instruction information displayed through the screen. Accordingly, the transparent electrodes of the upper electrode sheet and the lower electrode substrate corresponding to the partially pressed portion come in contact with each other partially and thus the operation position by the pen or the like is detected.

However, in Japanese Unexamined Patent Application Publication No. 2002-222055, as shown in FIG. 6B, the lower electrode substrate 105 has a shape in which side portions 105a and 105b are orthogonal to an upper surface 105c and a lower surface 105d, and a width of an upper surface 105c and a width of a lower surface 105d are the same. For this reason, when the transparent electrode 104 made of ITO or the like is formed on the upper surface 105c by a vacuum deposition method or a sputtering method, ITO may be attached to the side portions 105a and 105b. As a result, noise signals from the liquid crystal display or the like may enter the touch panel 101 to cause an incorrect operation of the touch panel 101.

In order to prevent the noise signals from entering the touch panel 101 from the liquid crystal display or the like, it is necessary to perform an insulation processing on the side portions 105a and 105b. Accordingly, the structure of the touch panel 101 becomes complex.

Further, according to the related art, a substrate on which the transparent electrode 104 is to be formed has a sufficiently larger area than the lower electrode substrate 105 and then the substrate with the transparent electrode 104 previously formed on the entire surface thereof is cut to have a predetermined area. In this case, after cutting, when an electrode made of silver or the like is formed on the transparent electrode 104 so as to detect the operation position of the pen or the like, the lower electrode substrate 105 is exposed to a high temperature. Accordingly, a warp occurs in the lower electrode substrate 105, as shown by arrows in FIG. 6B.

SUMMARY OF THE INVENTION

The invention has been made in consideration of the above-described problems, and it is an object of the invention to provide an input device that can prevent a resistive film from being formed on sides of a substrate with a simple structure and that can reduce a warp of the substrate, and to a display input device using the input device.

According to an aspect of the invention, an input device includes a flexible upper sheet that is provided with a resistive film formed on a lower surface thereof, and a lower substrate that is provided with a resistive film formed on an upper surface thereof, the upper sheet and the lower substrate being disposed at a predetermined gap, such that, when a point on an operation region of the upper sheet is pressed toward the lower substrate, a planar coordinate of the pressed point is detected, a pair of lower electrodes that are provided on the resistive film formed on the lower substrate at a predetermined gap in a direction from one side surface of the lower substrate toward the other side surface opposite to the one side surface. At least the one side surface and the other side surface have inclined surfaces, such that a width between the one side surface and the other side surface gradually narrows along a direction from the upper surface of the lower substrate toward a lower surface thereof.

According to the invention, the pair of lower electrodes are provided on the resistive film formed on the lower substrate at the predetermined gap in the direction from the one side surface of the lower substrate toward the other side surface opposite to the one side surface. Further, at least the one side surface and the other side surface have the inclined surfaces, such that the width between the one side surface and the other side surface gradually narrows along the direction from the upper surface of the lower substrate to the lower surface thereof. For this reason, an incorrect operation of the input device can be prevented from occurring since noise signals enter from a display member, such as a liquid crystal display into the input device, without forming the resistive film on the inclined surfaces. This effect is achieved by allowing the side portions to have the inclined surfaces, without performing an insulation treatment on the side portions. As a result, a correct operation of the input device can be performed with a simple structure, without complicating the structure of the input device.

In the input device according to the aspect of the invention, it is preferable that the resistive film on the lower substrate is formed from a side edge portion of the one side surface and the upper surface of the lower substrate to a side edge portion of the other side surface and the upper surface of the lower substrate.

When the resistive film is formed in such a manner, the lower electrodes can be provided near the side edge portions, respectively, thereby widening the operation region.

In the input device according to the aspect of the invention, it is preferable that the lower substrate is formed by means of an injection molding method.

For this reason, the inclined surfaces can be easily formed. Further, the substrate can be prevented from being warped due to heat at the time of molding. Further, the lower substrate can be separately molded at a desired size by means of the injection molding method and thus the resistive film can be formed uniformly and reliably on the lower substrate.

In the input device according to the aspect of the invention, it is preferable that the lower substrate is made of a transparent norbornene-based resin.

The transparent norbornene-based resin has high transmittance and thus it is difficult for double refraction to occur in the lower substrate. For this reason, images and the like displayed on the display member can be projected clearly and the images and the like can be viewed reliably from the top. Further, the transparent norbornene-based resin has superior heat resistance and thus it resists deformation caused by a high temperature at the time of injection molding. Accordingly, the warp at the time of molding of the lower substrate can be reduced. Further, the transparent norbornene-based resin has low hygroscopicity and therefore it absorbs little moisture from air. Accordingly, the strength of the lower substrate can be prevented from being changed due to moisture absorption.

Further, in the input device according to the aspect of the invention, the one side surface and the other side surface are surfaces supported by sidewalls of a case. For this reason, the lower substrate is supported by the sidewalls of the case.

According to another aspect of the invention, a display input device includes the input device as described above, the input device being a touch panel and overlapping on a display panel in a case. The one side surface and the other side surface of the lower substrate are supported by sidewalls of the case. Further, an inclination angle of each of the inclined surfaces provided on both side surfaces of the lower substrate is equal to an inclination angle of each of inclined surfaces provided on both sidewalls of the case.

In such a display input device, the inclined surfaces provided on both side surfaces of the lower substrate easily come in contact with the inclined surfaces provided on both sidewalls of the case, respectively, and the lower substrate is easily positioned on and fixed to the case. Further, since the inclined surfaces reliably come in contact with each other, dust or the like from the outside can be prevented from entering in the case. As a result, the input device and the display member can be prevented from deteriorating due to the dust or the like.

BRIEF DESCRIPTION OF THE DRAWINGS

FIG. 1 is a cross-sectional view of an input device of the invention;

FIG. 3 is a cross-sectional view taken along the line III-III of FIG. 2B;

FIG. 4 is a cross-sectional view when the input device of the invention is positioned on and fixed to a case;

DESCRIPTION OF THE PREFERRED EMBODIMENT

Figure 2A:
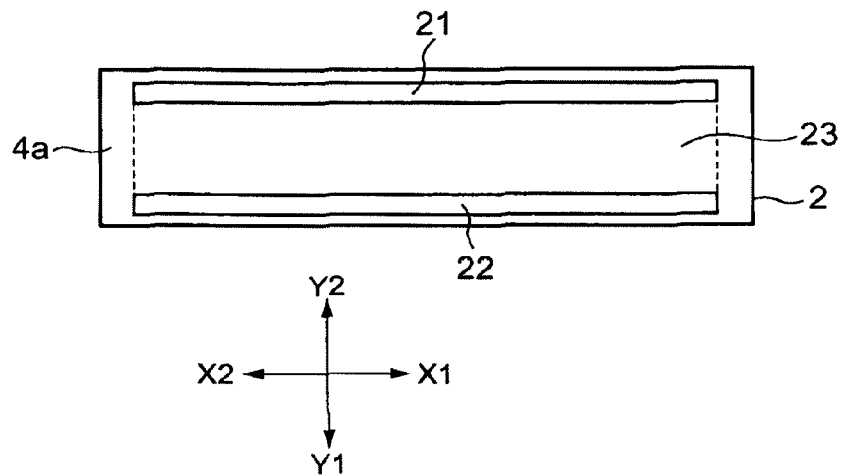
FIG. 2A is a rear view of an upper sheet of the invention.
Figure 2B:
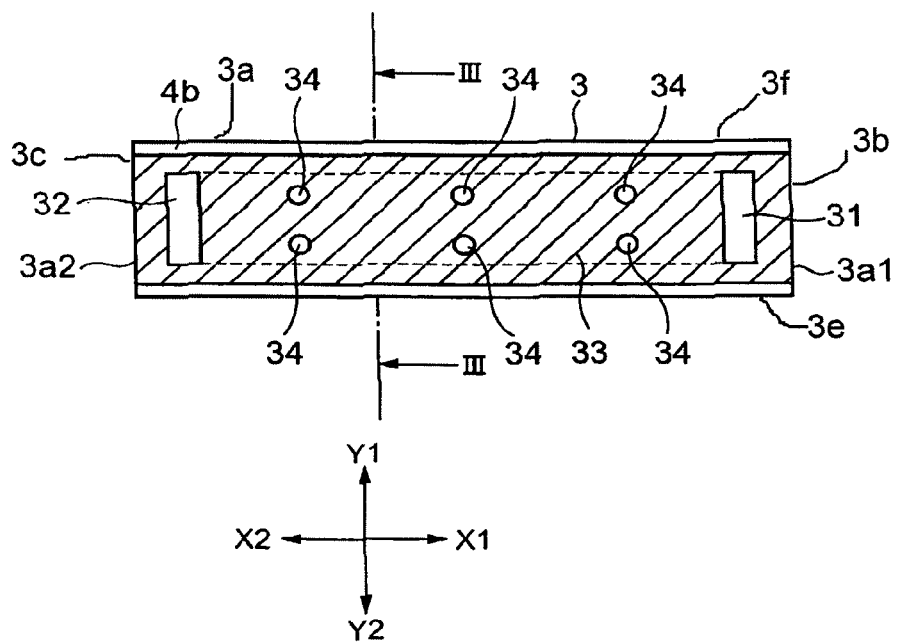
FIG. 2B is a plan view of a lower substrate.
Figure 5:
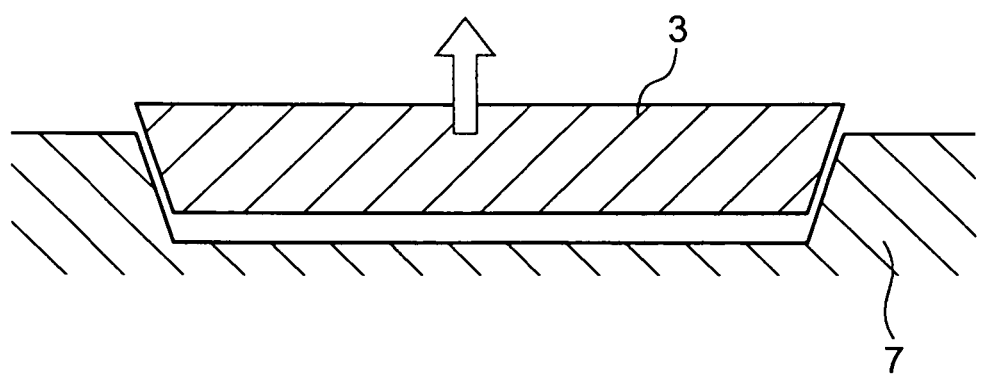
FIG. 5 is a diagram illustrating a situation when the lower substrate of the invention is formed by means of a mold.
Figure 6A:
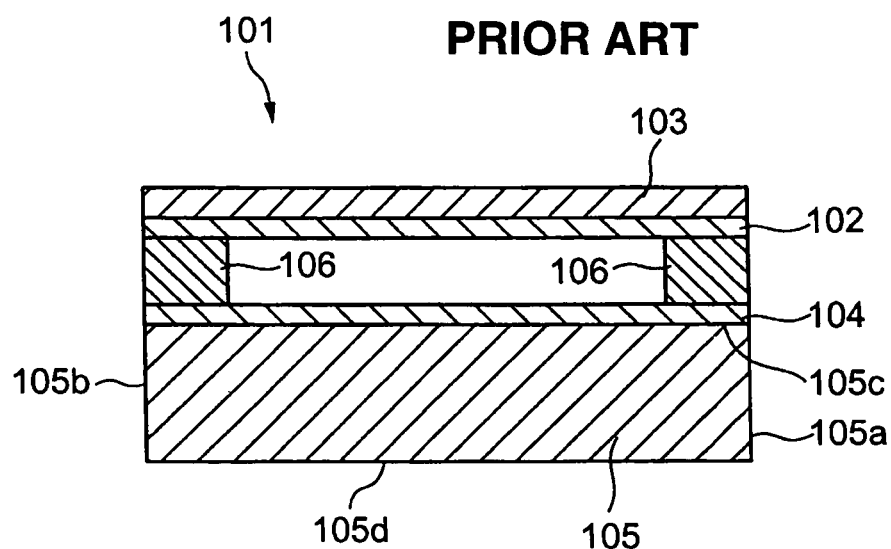
FIG. 6A is a cross-sectional view of an input device of the related art.
Figure 6B:
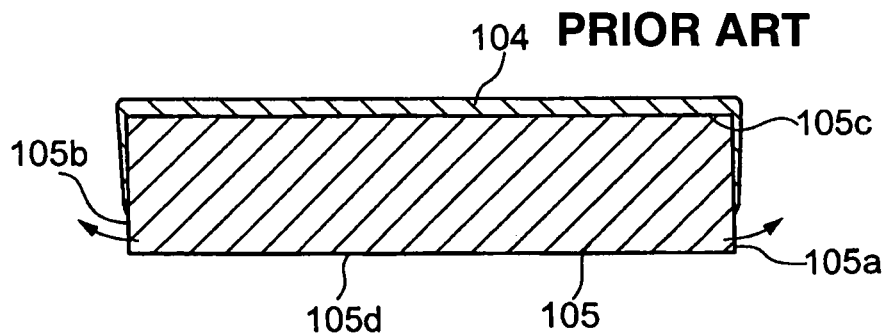
FIG. 6B is a diagram illustrating a method of forming a transparent electrode on a lower electrode substrate of the input device shown in FIG. 6A.

FIG. 1 is a cross-sectional view of an input device according to the invention. FIG. 2A is a rear view of an upper sheet of the invention and FIG. 2B is a plan view of a lower substrate. FIG. 3 is a cross-sectional view taken along the line of FIG. 2B. FIG. 4 is a cross-sectional view when the input device of the invention is positioned on and fixed to a case. FIG. 5 is a diagram illustrating a situation when the lower substrate of the invention is formed by means of a mold. Moreover, in order to clear the internal structure of an input device of the invention, in FIG. 1, an insulating spacer is shown thicker than the actual one. Further, in order to clear a state in which the input device is positioned on and fixed to a case, in FIG. 4, inclined surfaces of the case are shown slower than the actual one. Further, resistive films and electrodes provided on the upper sheet and the lower substrate are omitted.

As shown in FIG. 1, an input device 1 of the invention has an upper sheet 2 and a lower substrate 3. Further, as shown in FIG. 4, the input device 1 is positioned on and fixed to a case 6 at a predetermined gap above a display panel 4 and a light guiding member 5 of a liquid crystal display or the like.

The upper sheet 2 is made of transparent synthetic resin, such as polyethyleneterephthalate, to have flexibility. As shown in FIG. 1, on the entire surface of a lower surface 2a of the upper sheet 2, a resistive film 4a is formed to have a predetermined thickness. The resistive film 4a is made of ITO (Indium Tin Oxide) by a sputtering method, a vacuum deposition method, or the like. In addition, as shown in FIG. 2A, a pair of upper electrodes 21 and 22 made of silver or the like are formed in parallel with each other on the resistive film 4a at a gap in a Y1-Y2 direction. An operation region 23 is formed between the pair of upper electrodes 21 and 22.

The lower substrate 3 is a transparent plastic substrate. As shown in FIG. 2B, on a predetermined region of an upper surface 3a of the lower substrate 3, like the resistive film 4a, a resistive film 4b made of ITO is formed to have a predetermined thickness. Further, a pair of lower electrodes 31 and 32 made of silver or the like are formed in parallel with each other on the resistive film 4b at a gap in an X1-X2 direction. An operation region 33 is formed between the pair of lower electrodes 31 and 32. Further, on the operation region 33, a plurality of dot spacers 34 are formed. The dot spacers are provided so as to prevent an erroneous contact from occurring in the lower substrate 3 due to the warp of the upper sheet 2 caused by external factors. Here, it is assumed that a side surface of the lower substrate 3 on the Y2 side is a front side surface, a side surface on the Y1 side is a rear side surface, a side surface on the X1 side is a right side surface, and a side surface on the X2 side is a left side surface.

As shown in FIG. 1, the upper sheet 2 is combined with the lower substrate 3 so as to face the lower substrate 2 at a predetermined gap via an insulating spacer 50. Here, the resistive film 4a formed the lower surface 2a of the upper sheet 2 faces the resistive film 4b formed on the lower substrate 3. Further, the upper electrodes 21 and 22 are disposed on side portions of the upper sheet 2 that do not overlap the lower electrodes 31 and 32.

The case 6 is formed by means of an injection molding method. The case 6 has sidewall portions 6a and 6b and has a hollow internal structure. Inner surfaces of front ends of the sidewall portions 6a and 6b have inclined surfaces 6a1 and 6b1 each having the inclination angle of θa. Accordingly, the case 6 is easily released from a mold at the time of molding by means of the injection molding method. Further, the sidewall portions 6a and 6b are made of white acrylonitrile butadiene styrene copolymer (ABS) resin so as to efficiently reflect light from the light guiding member 5 inside the case 6.

As shown in FIG. 1, as regards the lower substrate 3 of the invention, the right and left side surfaces 3b and 3c have inclined surfaces each having a predetermined inclination angle of θ with regard to the vertical direction (the Z direction). At this time, a width between both side surfaces (a length in the X1-X2 direction) narrows gradually from the upper surface 3a of the lower substrate 3 to the lower surface 3d thereof.

Here, the resistive film 4b made of ITO is film-formed on the upper surface 3a of the lower substrate 3 by a sputtering method, a vacuum deposition method, or the like. When being attached to the substrate on which the resistive film is to be formed, sputtered atoms or deposited atoms move thereon. That is, the sputtered atoms or the deposited atoms have progressive property on the substrate.

According to the invention, since the right and left side surfaces 3b and 3c of the lower substrate 3 have the inclined surfaces, when the resistive film 4b is film-formed on the upper surface 3a, there is no probability that the sputtered atoms or the like for forming the resistive film 4b wrap around the right and left side surfaces 3b and 3c and form resistive films on the right and left side surfaces 3b and 3c. As a result, an incorrect operation of the input device 1 can be prevented from occurring since the resistive films are film-formed on parts of the right and left side surfaces 3b and 3c, and the noise signals enter from the liquid crystal display or the like to the input device 1. This effect is achieved by forming the right and left side surfaces 3b and 3c to have the inclined surfaces, without performing an insulation treatment on the right and left side surfaces 3b and 3c. For this reason, the incorrect operation of the input device 1 can be prevented with a simple structure.

According to the invention, the inclined surfaces need to be provided on, among the side surfaces of the lower substrate 3, at least side surfaces of the lower substrate 3 in a direction in which the lower electrodes 31 and 32 face each other. Further, according to the invention, in order to widen the operation region 33, the lower electrodes 31 and 32 are provided near right and left edge portions 3a1 and 3b1 of the lower substrate 3, respectively. Here, the right edge portion 3a1 is a side edge portion of the upper surface 3a and the right side surface 3b, and the left edge portion 3a2 is a side edge portion of the upper surface 3a and the left side surface 3c.

For this reason, as indicated by a hatched region in FIG. 2B, the resistive film 4b is film-formed up to the right and left edge portion 3a1 and 3b1. As a result, at least the side surfaces in the direction in which the lower electrodes 31 and 32 face each other, that is, the right and left side surfaces 3b and 3c, have the inclined surfaces.

According to the invention, the lower substrate 3 is separately molded to have a desired size by means of the injection molding method. Accordingly, the right and left side surfaces 3b and 3c can be easily formed to have the inclined surfaces. Further, the electrodes may be formed on a large substrate of a constant area with a resistive film provided thereon and then the large substrate may be cut to prepare a plurality of lower substrates 3 each having a desired size. In this case, the large substrate may be exposed to a high temperature when the lower electrodes 31 and 32 are formed thereon or when the lower electrodes 31 and 32 are printed and dried. However, even though the large substrate is exposed to the high temperature, the large substrate can be prevented from being warped by heat. Further, since the lower substrate 3 is separately molded to have the desired size by means of the injection molding method, the resistive film 4b can be film-formed uniformly and reliably on the upper surface 3a of the lower substrate 3. Further, since the right and left side surfaces 3b and 3c of the lower substrate 3 have the inclined surfaces, as shown in FIG. 5, the lower substrate 3 is easily released from a mold at the time of molding of the lower substrate 3. As a result, the lower substrate 3 having less warp can be obtained.

In addition, according to the injection molding method, a linear gate is provided on the Y1 or Y2 side along a width of an end portion on the Y1 or Y2 side of the lower substrate 3. A resin for forming the lower substrate 3 is injected from the linear gate into a cavity of a mold 7. For this reason, the resin is uniformly and planarly injected to form the uniform lower substrate 3. As a result, double refraction does not occur in the lower substrate 3, such that images and the like displayed on the liquid crystal display can be reliably viewed from the top.

Moreover, in the lower substrate 3 according to the invention, only one of the front and rear side surfaces 3e and 3f may have an inclined surface, like the right and left side surfaces 3b and 3c, as shown in FIG. 3. Alternatively, both side surfaces may have surfaces parallel to the Z axis, not have the inclined surfaces. Here, in the injection molding method of the invention, the linear gate is provided on the Y1 or Y2 side along the width of the end portion on the Y1 or Y2 side of the lower substrate 3. For this reason, at least one of the front and rear side surfaces 3e and 3f has the surface parallel to the Z axis. There is no case in which both side surfaces have the inclined surfaces.

In the invention, as described above, the lower substrate has the right and left side surfaces 3b and 3c as the inclined surfaces. Accordingly, the right side surface 3b and the inclined surface 6a1 of the case 6 can easily come in contact with each other. Similarly, the left side surface 3c and the inclined surface 6b1 of the case can easily come in contact with each other. As a result, the lower substrate 3 is supported easily and reliably by the sidewall portions 6a and 6b of the case 6.

The lower substrate 3 of the invention may be made of a transparent norbornene-based resin. The transparent norbornene-based resin has high transmittance, such that it is difficult for double refraction to occur in the lower substrate 3. Accordingly, the images and the like displayed on the liquid crystal display can be projected clearly and the images and the like can be viewed reliably from the top. Further, the transparent norbornene-based resin has superior heat resistance and thus resists warping at a high temperature at the time of injection molding. Accordingly, the warp at the time of molding of the lower substrate 3 can be reduced. Further, the transparent norbornene-based resin has low hygroscopicity and thus it absorbs little moisture from air. Accordingly, the strength of the lower substrate 3 can be prevented from being changed due to the moisture absorption.

Next, a method of manufacturing the lower substrate 3 of the invention will be described.

First, the lower substrate 3 of the desired size is molded by means of the injection molding method. Next, after a portion on which the linear gate is provided is cut, the lower substrate is released from the mold 7, as shown in FIG. 5. Subsequently, a mask layer is disposed on the upper surface 3a of the lower substrate 3 and the resistive film 4b is film-formed on the mask layer and the portion indicated by the hatched region in FIG. 2B by means of the sputtering method or the like. Subsequently, the mask layer is removed. Alternatively, first, the resistive film 4b is film-formed on the portion indicated by the hatched region in FIG. 2B by the sputtering method or the like. Next, a mask layer is disposed on only a required portion of the resistive film 4b, while a useless portion thereof is removed by etching or the like.

After the resistive film 4b is film-formed on the portion of the upper surface 3a indicated by the hatched region, as described above, the lower electrodes 31 and 32 are molded on the resistive film 4b through printing and then the dot spacers 34 are formed.

Next, the operation of the input device 1 of the invention will be described.

For example, when an arbitrary point in the operation region 23 of the upper sheet 2 is pressed downward by an input pen (not shown) or the like, first, the upper sheet 2 is deformed such that the resistive film 4a formed on the upper sheet 2 comes in contact with the resistive film 4b formed on the lower substrate 3 between operation regions 23 and 33.

If doing so, a voltage is alternately applied across the upper electrodes 21 and 22 and across the lower electrodes 31 and 32 by a control unit (not shown) several times at predetermined time intervals. When the voltage is applied across the upper electrodes 21 and 22, a coordinate position in the Y direction of the operation region 23 by the input pen or the like is detected from the contact point of the resistive film 4a and the resistive film 4b and the resistance ratio between the upper electrodes 21 and 22. Similarly, when the voltage is applied across the lower electrodes 31 and 32, a coordinate position in the X direction of the operation region 23 by the input pen or the like is detected from the contact point and the resistance ratio between the lower electrodes 31 and 32. In such a manner, the coordinate positions on the XY plane of the operation region 23 by the input pen or the like are detected.

The input device 1 of the invention is a touch panel which can be integrally mounted on a display panel 4, such as a liquid crystal display, as shown in FIG. 4. In this case, the input device 1 and the display panel 4 are combined with each other and are used as a display input device 10.

The display input device 10 has the input device of the invention and thus the operation from the input device 1 is accurately transmitted, without being influenced by the noise signals.

Further, as shown in FIG. 4, the lower substrate 3 is supported by the sidewall portions 6a and 6b of the case and therefore the input device 1 is positioned on and fixed to the case 6. At this time, the right side surface 3b of the lower substrate 3 comes in contact with the inclined surface 6a1 of the case 6, such that the right side surface 3b is supported by the sidewall portion 6a. Further, the left side surface 3c of the lower substrate 3 comes in contact with the inclined surface 6b1 of the case 6, such that the left side surface 3c is supported by the sidewall portion 6b. For this reason, dust or the like from the outside can be prevented from entering the hollow case 6. As a result, the input device 1 and the display member 4 can be more reliably prevented from deteriorating due to the dust or the like.

Further, the inclination angle θ of each of the inclined surfaces, that is, the right and left side surfaces 3b and 3c of the lower substrate 3 is equal to the inclination angle θa of each of the inclined surfaces 6a1 and 6b1 of the case. In this case, the right and left side surfaces 3b and 3c more easily come into contact with the inclined surfaces 6a1 and 6b1, respectively, and thus the lower substrate 3 is easily positioned on and fixed to the case. Further, since the right and left sides 3b and 3c more reliably come in contact with the inclined surfaces 6a1 and 6b1, respectively, such that the case 6 is shielded by the lower substrate 3. Therefore, the dust or the like from the outside can be prevented from entering the hollow of the case 6. As a result, the input device 1 and the display member 4 can be more reliably from deteriorating due to the dust or the like.

In order to achieve the above-described effects, it is preferable that the inclination angle θ of each of the inclined surfaces of the right and left side surfaces 3b and 3c is in a range of from 2° to 10°.

In accordance with the input device according to the aspect of invention, the resistive film can be prevented from being formed on the side of the substrate of the input device with a simple structure. Further, the warp of the substrate can be reduced.

The invention claimed is:

1. An input device comprising:
   an upper sheet having a resistive film formed on a lower surface thereof;
   a lower substrate disposed in a co-planar relationship below the upper sheet and spaced apart from the upper sheet by a gap, the lower substrate having a resistive film formed on an upper surface thereof;
   the lower substrate having opposite first and second side edge portions disposed along a longitudinal axis of the lower substrate, the first and second side edge portions having an incline or taper along a thickness axis of the lower substrate;
   the lower substrate having opposite third and fourth side edge portions in an orthogonal direction to the longitudinal axis, the third side portion having an incline or taper along the thickness axis of the lower substrate, the fourth side portion having a surface parallel to the thickness axis of the lower substrate;
   a pair of lower electrodes formed on the resistive film of the lower substrate, and disposed parallel to the first and second side edge portions of the lower substrate, the lower substrate having a constant thickness between the pair of lower electrodes;
   wherein the lower substrate is formed by an injection molding process; and
   wherein when pressure is applied to an operation portion of the upper sheet, the upper sheet flexes toward the lower substrate, and planar coordinates of the operation portion are determined based on a voltage between the pair of lower electrodes.

2. The input device according to claim 1, wherein the resistive film on the lower substrate is formed between respective side edge portions of the lower substrate.

3. The input device according to claim 1, wherein the incline or taper of the side edge portions range from 2° to 10°.

4. The input device according to claim 1, further including a case having sidewalls configured to contact the first, second and third side edge portions of the lower substrate to support the lower substrate.

5. A display input device comprising the input device according to claim 1, a light guiding member display, a display overlapping the light guiding member, and a case;
   the input device being a touch panel and overlapping the display,
   wherein the case has sidewalls configured to support the first, second, and third side edge portions of the lower substrate,
   wherein the case is connected to the light guiding member, the display, and the input device, and a first inclination angle of each of the first, second and third side edge portions of the lower substrate is equal to a second inclination angle of each of the sidewalls of the case.

* * * * *